Figure 1:
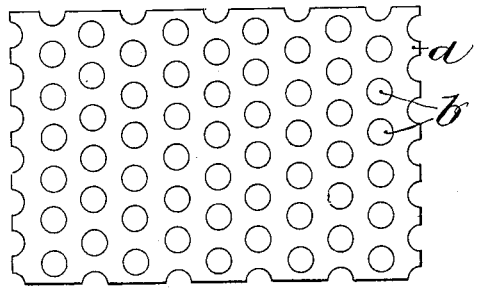

No. 662,003. Patented Nov. 20, 1900.
A. LAMM.
WASHER.
(Application filed June 9, 1900.)

(No Model.) 3 Sheets—Sheet 1.

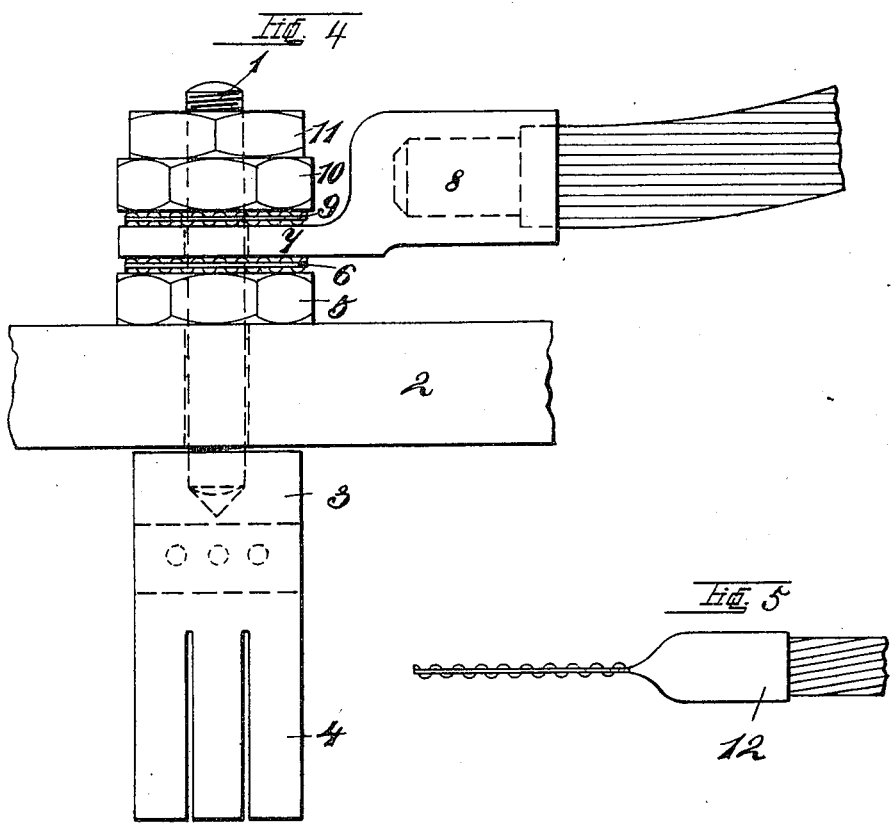

No. 662,003. Patented Nov. 20, 1900.
A. LAMM.
WASHER.
(Application filed June 9, 1900.)
(No Model.) 3 Sheets—Sheet 3.

Witnesses:

Inventor:
Alfred Lamm.

United States Patent Office.

ALFRED LAMM, OF BERLIN, GERMANY.

WASHER.

SPECIFICATION forming part of Letters Patent No. 662,003, dated November 20, 1900.

Application filed June 9, 1900. Serial No. 19,743. (No model.)

*To all whom it may concern:*

Be it known that I, ALFRED LAMM, engineer, a subject of the King of Prussia, Emperor of Germany, and a resident of Berlin, Germany, have invented certain new and useful Improvements in Washers; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has for its object a bonding material for washers for use in joints of electrical conductors, which are designed to either wholly or partially fill up the interstices between the abutting surfaces, especially when said surfaces are uneven, and to maintain a good contact through varying temperature changes, so that the heating effect due to an increased resistance at such joints will be as small as possible. Heretofore it has been the practice to carefully grind the joints and coat or pack them with tin or lead washers or corrugated washers, whereby a good contact could not be obtained, especially as the compression of these washers or packings due to temperature changes in one direction were such that they would not respond to temperature changes in an opposite direction, thereby leaving the packing loose and causing more or less heating at the joint, due to increased resistance. Such a loosening of the joints occurs when metallic packings are used, while soft bodies that pack hard metal joints are continually being squeezed out by increased pressure. Washers or packings having concentric corrugations do not give a good enough contact, especially between uneven surfaces, owing to the stiffening effect of these corrugations and their tendency to flatten out and break when the washer is strained by uneven meeting surfaces. I have avoided these difficulties by making a bond of conductive material that is given such a form as to be bent in any direction—that is, made mechanically pliable—a property imparted to sheet metal by means of independent or eccentric embossed shapes arranged in regular or irregular order on one or both sides of the sheet of metal, and, if necessary, this metal may be conductive spring metal. The projections, which are conveniently quincuncially arranged, form good contact-points, leave the body of the sheet free to bend in any direction, render it elastic in the direction of pressure, and thereby respondent to variations of pressure due to temperature changes, and capable of always making good contact with uneven surfaces.

Figure 2:
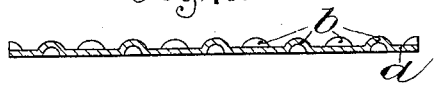
Figure 3:
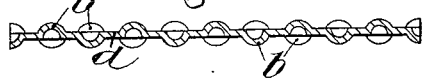
Figure 6:
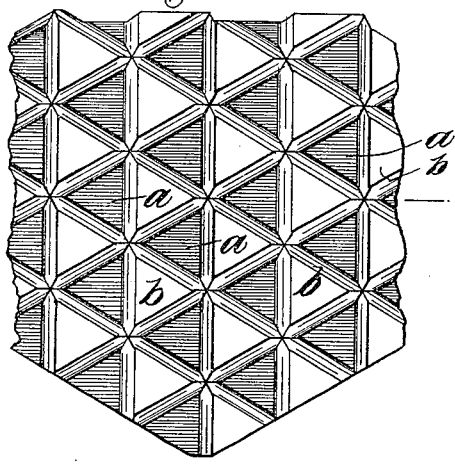
Figure 7:

Referring to the drawings, in which like parts are similarly designated, Figure 1 shows a sheet-bond provided with embossing on one side, from which washers, gaskets, and other forms of packings are to be cut. Fig. 2 is a section of the plate shown in Fig. 1. Fig. 3 is a section of a plate having embossings on both sides thereof. Fig. 4 shows the end of a cable, the anchor being held between nuts and washers made in accordance with my invention. Fig. 5 shows a cable socket or anchor flattened and embossed so as to form itself the packing. Fig. 6 illustrates a regularly-arranged embossing of a different shape; Fig. 7, a section of the same, and Fig. 8 illustrates the use of a gasket with a soft-metal filler.

The example of packing material shown in Figs. 1 and 2 comprises a sheet of metal $a$, provided with embossing $b$ on one side thereof, the embossing being here shown as of symmetrical figures quincuncially arranged. The gaskets or washers are cut therefrom, or it is used when necessary in sheet form. Fig. 3 is a similar form, in which the spherical embossings project alternately on either side of the plate. I do not limit myself to the particular form of these embossings, which may be of any shape and size and arranged in any order, so long as they do not assume continuous or concentric corrugations, which latter tend to stiffen the sheet rather than increase its flexibility, and in Figs. 6 and 7 I have shown another regularly arranged regular form.

In the cable-terminal shown in Fig. 4 as an example of the use of washers made of this material the switchboard 2, of marble or other insulating material, carries the bolt 1, which has screwed on one end thereof the block 3, that supports the circuit-closing spring 4 of the switch. On the other end of said bolt is a nut 5, and between this nut 5 and the nut 10 is secured the tinned eye 7 of the cable-socket 8. On either side of the eye 7 and between it and the nuts 5 and 10 are placed elastic or pliable embossed washers 6 and 9, made from conductive and preferably of spring metal of the form shown in section in Fig. 3. The lock-nut 11 secures the parts permanently in place. The embossings give a great number of contact-points and insure good conductivity through the joint. In Fig. 5 the eye is made thin and similarly embossed, thus dispensing with washers.

Figure 8:
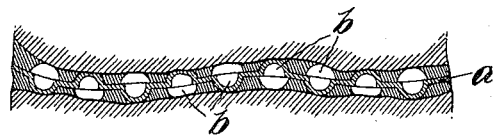

So far I have shown washers or bonds which are not water-tight; but it is obvious that such water-tight washers or bonds are necessary for water and gas main packings, especially when these mains are used for return-circuits, and Fig. 8 is a section of part of such a joint having uneven meeting surfaces and using the described packing with a softer or more malleable metal as a filler, a good example of such filler being lead, whereby the lead is distributed between and held by the embossings to form a water-tight joint, while the embossings themselves form good contact-points between the abutting faces, and when spring metal is used the packing or bond is especially pliable and resilient, readily responding to temperature changes.

Having thus described my invention, what I claim as new therein, and desire to secure by Letters Patent, is—

1. In combination with the meeting surfaces of a joint, a conductive metallic sheet and a softer metallic filler, said metallic sheet formed to hold said filler, substantially as set forth.

2. In combination with the meeting surfaces of a joint, a conductive metallic sheet, projections on said sheet, and a softer metallic filler held between said projections, substantially as set forth.

3. In combination with the meeting surfaces of a joint, a conductive metallic sheet, embossed projections on said sheet independent of one another, and a softer metallic filler held between said projections, substantially as set forth.

4. In combination with the meeting surfaces of a joint, a conductive metallic sheet, embossed spherical projections thereon independent of one another, and a lead filler held between said projections, substantially as set forth.

5. In combination with the meeting surfaces of a joint, a conductive spring-metal sheet, spherical projections thereon quincuncially arranged, and a lead filler held between said projections, substantially as set forth.

6. In combination with the meeting surfaces of a joint, a conductive spring-metal sheet, spherical embossings on both sides of said sheet quincuncially arranged, and a lead filler held between and by said embossings, substantially as and for the purposes set forth.

In testimony that I claim the foregoing as my invention I have signed my name in presence of two subscribing witnesses.

ALFRED LAMM.

Witnesses:
MAX C. STAEHLER,
HENRY HASPER.